(12) United States Patent
Gretz

(10) Patent No.: US 6,951,983 B1
(45) Date of Patent: Oct. 4, 2005

(54) OUTLET BOX ASSEMBLY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 23 days.

(21) Appl. No.: 10/880,636

(22) Filed: Jun. 30, 2004

(51) Int. Cl.[7] ............................................. H01R 13/46
(52) U.S. Cl. ........................ 174/58; 174/63; 220/3.6; 248/906
(58) Field of Search ........................... 174/48, 50, 53, 174/54, 57, 58, 61, 62, 63; 220/3.2–3.9, 4, 220/2

(56) References Cited

U.S. PATENT DOCUMENTS

| | | | | |
|---|---|---|---|---|
| 1,725,293 | A | * | 8/1929 | Morgenstern ............... 248/906 |
| 1,857,787 | A | * | 5/1932 | Meeks et al. ................. 220/3.4 |
| 2,842,281 | A | * | 7/1958 | Chisholm .................... 220/3.6 |
| 3,052,369 | A | * | 9/1962 | Taibi ........................... 220/3.6 |
| 3,773,968 | A | * | 11/1973 | Copp ........................... 174/53 |
| 3,863,037 | A | * | 1/1975 | Schindler et al. ............ 220/3.9 |
| 4,063,660 | A | * | 12/1977 | Ware ........................... 220/3.6 |
| 4,674,646 | A | | 6/1987 | Teron |
| 4,919,370 | A | * | 4/1990 | Martin et al. ........... 174/153 G |
| 5,005,792 | A | * | 4/1991 | Rinderer ...................... 220/3.5 |
| 5,445,539 | A | * | 8/1995 | Dale ............................. 174/53 |
| 5,500,487 | A | * | 3/1996 | Leon ............................ 174/53 |
| 5,740,936 | A | | 4/1998 | Nash |
| 6,198,045 | B1 | * | 3/2001 | Roesch ....................... 248/906 |
| 6,338,225 | B1 | * | 1/2002 | Hayes .......................... 174/50 |
| 6,417,447 | B1 | | 7/2002 | Bosse, Jr. |
| 6,578,321 | B2 | | 6/2003 | Layne |
| 6,596,938 | B2 | | 7/2003 | Gilleran |

* cited by examiner

*Primary Examiner*—Chau N. Nguyen
*Assistant Examiner*—Adolfo Nino

(57) ABSTRACT

An outlet box assembly that simplifies the installation of an electrical box to a block wall. The assembly includes a box and a base plate. The box includes sidewalls, an open front with a planar front edge, and one or more side arms projecting from the sidewalls in a plane parallel to the planar front. The side arms include one or more apertures for receipt of fasteners. The base plate is substantially larger in area than the sidewalls of the box and includes an opening therein sized to accept the sidewalls of the box. The box is secured to a block wall by creating a hole in the wall at the desired location, positioning the base plate over the hole and against the wall, placing the box through the opening in the base plate until the back surface of the arms are flush with the base plate, and driving fasteners through one or more of the apertures in the side arms, through the base plate, and into the cement block.

34 Claims, 10 Drawing Sheets

OUTLET BOX ASSEMBLY

FIELD OF THE INVENTION

This invention relates to electrical junction boxes and specifically to an assembly that simplifies the task of installing an outlet box in a cement block wall.

BACKGROUND OF THE INVENTION

Duplex outlets, switches, and other electrical devices are frequently mounted to walls constructed of cement or aggregate blocks. To mount an electrical device in such a wall, the installer typically breaks a hole in a block at the desired location, with the hole large enough to accept an electrical box. The hole, typically made with a hammer and chisel, is usually somewhat larger than the box. Furring strips are then typically secured to the surface of the block wall to provide a brace for accepting the fasteners of a standard electrical box. The electrical box is aligned with its front face planar with the wall surface and the box fasteners driven into the furring strip to secure the box to the wall. The oversize hole is typically filled in by blowing pressurized foam, such as polyurethane foam, into the spaced between the box and surrounding block surface to seal the space between the box and the block. After the foam has cured, portions of it typically extend outwards of the block wall and from the base of the electrical box. This prior art method of installing an electrical device is illustrated in FIGS. 10–12. FIG. 10 depicts in exploded relationship an oversize hole 200 broken in the block wall 202, two furring strips 204 in position to be secured to the wall by fasteners 206, a prior art electrical box 208, a duplex receptacle 210, and a faceplate 212. FIG. 11 depicts the furring strips 204 secured to the wall, the prior art electrical box 208 secured to one of the furring strips 204 by a fastener 214, a duplex receptacle 210 and faceplate 212 in alignment with the electrical box 208, and foam 216 that has been used to fill the oversize hole. FIG. 12 depicts a completed installation of a prior art electrical box 208 to a block wall 202 including the furring strips 204 secured to the wall 202, the electrical box 208 secured to one of the furring strips 204, and cured polyurethane foam 216 that has been used to fill the oversize hole 200. With reference to FIG. 10, it should be apparent that this prior art method of providing an electrical box 208 on a block wall 202 is a cumbersome, labor intensive, time-consuming task that leads to an unattractive result. Typically the cured foam 216 extends well beyond the face of the wall 202 and it is difficult to trim the extending foam neatly. In a situation in which the wall will be covered with a finished surface, such as drywall or paneling, it is not important to have an attractive installation. But in those situations in which a finished surface is not applied, the prior art method leaves a very unattractive box. Furthermore, it is difficult in the prior art method to get the proper offset from the anticipated surface of the later installed finished layer, as the prior art box is mainly intended for installation on framed walls, and the fasteners that come with the box are not positioned to create a desired offset. The installer must therefore estimate the desired position of the electrical box to make it even with the finished wall.

It should be appreciated from the above description of installing an electrical box in a block wall that the procedure involves numerous steps and, as a result of the curing time for the foam, a substantial length of time. The installation requires two fastening steps, including fastening the furring strips to the block wall and then fastening the box to the furring strips. The current technique for installing an electrical box in a block wall therefore requires a great deal of time and effort. As a result of sealing the oversize hole with foam, the installed box is not very attractive to the eye as it is difficult to provide a smooth wall surface immediately surrounding the perimeter of the box. For these reasons, installation of an electrical box in a cement block wall is tedious and does not produce an attractive final result.

What is needed therefore is a device that reduces the time and effort involved in installing an electrical box in a cement block wall and provides an eye pleasing final result.

SUMMARY OF THE INVENTION

The invention is an outlet box assembly that simplifies the installation of an electrical box to a wall constructed of cement blocks. It includes a box and a base plate. The box includes sidewalls, an open front with a planar front edge, and one or more side arms projecting from the sidewalls in a parallel plane to the planar front. The side arms include one or more apertures for receipt of fasteners. The base plate is substantially larger in area than the sidewalls of the box and includes an opening therein sized to accept the sidewalls of the box. The box is secured to a block wall by creating a hole in the wall at the desired location, positioning the base plate over the hole and against the wall, placing the outlet box through the opening in the base plate until the back surface of the arm is flush with the base plate, and driving fasteners through one or more of the apertures in the side arms, through the base plate, and into the cement block.

OBJECTS AND ADVANTAGES

The X-shaped outlet box of the present invention simplifies the process of providing an electrical box in a cement block wall. Much less time and effort are required to install the electrical box of the current invention than is required with conventional methods.

Another advantage provided by the electrical box of the present invention is that it eliminates the need for furring strips to prepare a cement block wall for an electrical box. This greatly reduces the complexity of installing electrical boxes to a block wall.

A further advantage is that the electrical box assembly eliminates any gaps between the installed box and the surrounding block surface.

Another advantage is that the electrical box of the present invention eliminates the need for insulating foam to cover any gaps between the box and the surrounding block surface.

These and other objects and advantages of the present invention will be better understood by reading the following description along with reference to the drawings.

DESCRIPTION OF THE DRAWINGS

FIG. 4A is a detailed view of a removable portion of the outlet box of FIG. 4.

FIG. 4B is a detailed view of the removable portion of the outlet box of FIG. 4 as viewed from the outer rear corner of the outlet box.

TABLE OF NOMENCLATURE

Figure 1:
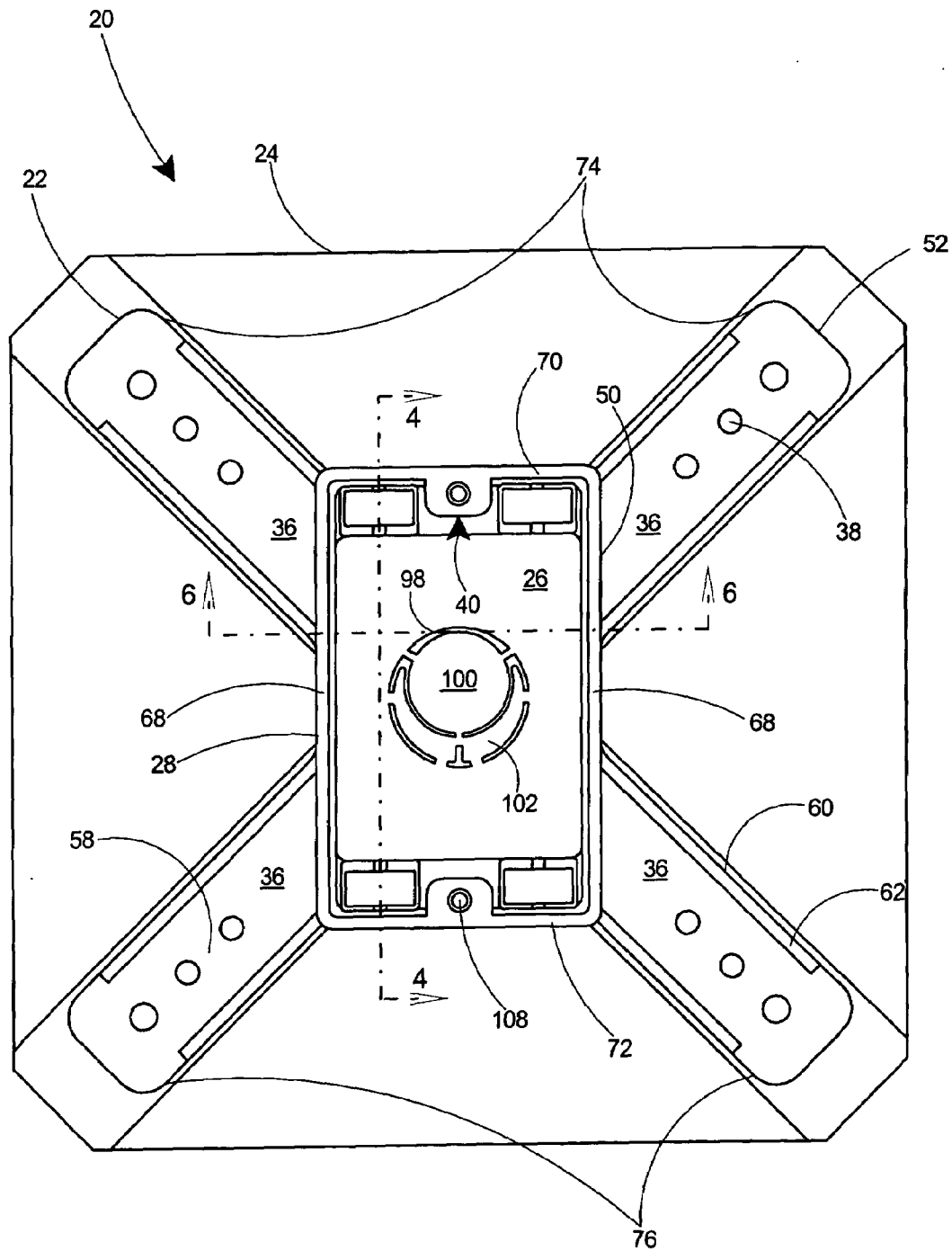
FIG. 1 is a front elevation view of a first and preferred embodiment of an X-shaped outlet box according to the present invention.

The following is a listing of part numbers used in the drawings along with a brief description:

| Part Number | Description |
| --- | --- |
| 20 | outlet box assembly |
| 22 | housing |
| 24 | base plate |
| 26 | planar back wall |
| 28 | peripheral sidewalls of housing |
| 30 | open front of housing |
| 32 | enclosure |
| 34 | planar front edge of housing |
| 36 | arm |
| 38 | aperture in arm |
| 40 | securement arrangement |
| 42 | fasteners |
| 44 | electrical device |
| 48 | central opening in base plate |
| 50 | base end of arm |
| 52 | distal end of arm |
| 54 | front surface of arm |
| 56 | back surface of arm |
| 58 | central portion |
| 60 | edges of arm |
| 62 | rib |
| 64 | offset distance |
| 66 | short sidewalls |
| 68 | long sidewalls |
| 70 | top sidewall |
| 72 | bottom sidewall |
| 74 | first pair of arms |
| 76 | second pair of arms |
| 78 | front surface of base plate |
| 80 | back surface of base plate |
| 82 | outer edges of base plate |
| 84 | inner edges of base plate |
| 86 | alignment tab |
| 88 | thick portion of base plate |
| 90 | thin portion of base plate |
| 92 | fastener |
| 94 | removable wall section |
| 96 | juncture of sidewalls and back wall of housing |
| 98 | additional removable wall section |
| 100 | first removable section |
| 102 | second removable section |
| 104 | integral projections |

-continued

| Part Number | Description |
| --- | --- |
| 106 | inner surfaces of top and bottom sidewalls |
| 108 | threaded bores |
| 110 | front surface of integral projections |
| 112 | hole in wall |
| 114 | block wall |
| 120 | faceplate |
| 122 | faceplate fastener |
| 200 | oversize hole |
| 202 | block wall |
| 204 | furring strip |
| 206 | fastener |
| 208 | prior art electrical box |
| 210 | duplex receptacle |
| 212 | faceplate |
| 214 | fastener |
| 216 | foam |

DETAILED DESCRIPTION OF THE INVENTION

The present invention is an outlet box assembly for securing an electrical device on a block wall. The outlet box assembly can be easily installed on a block wall. When installed on a wall with an electrical device installed therein, the outlet box assembly provides a visually attractive electrical outlet, switch, or other electrical device. If the block wall is later finished with drywall, stucco, or a similar wall covering, the outlet box assembly includes a planar front edge that extends outwards from the wall, thereby situating the outlet box approximately even with the finished wall surface.

Figure 7:
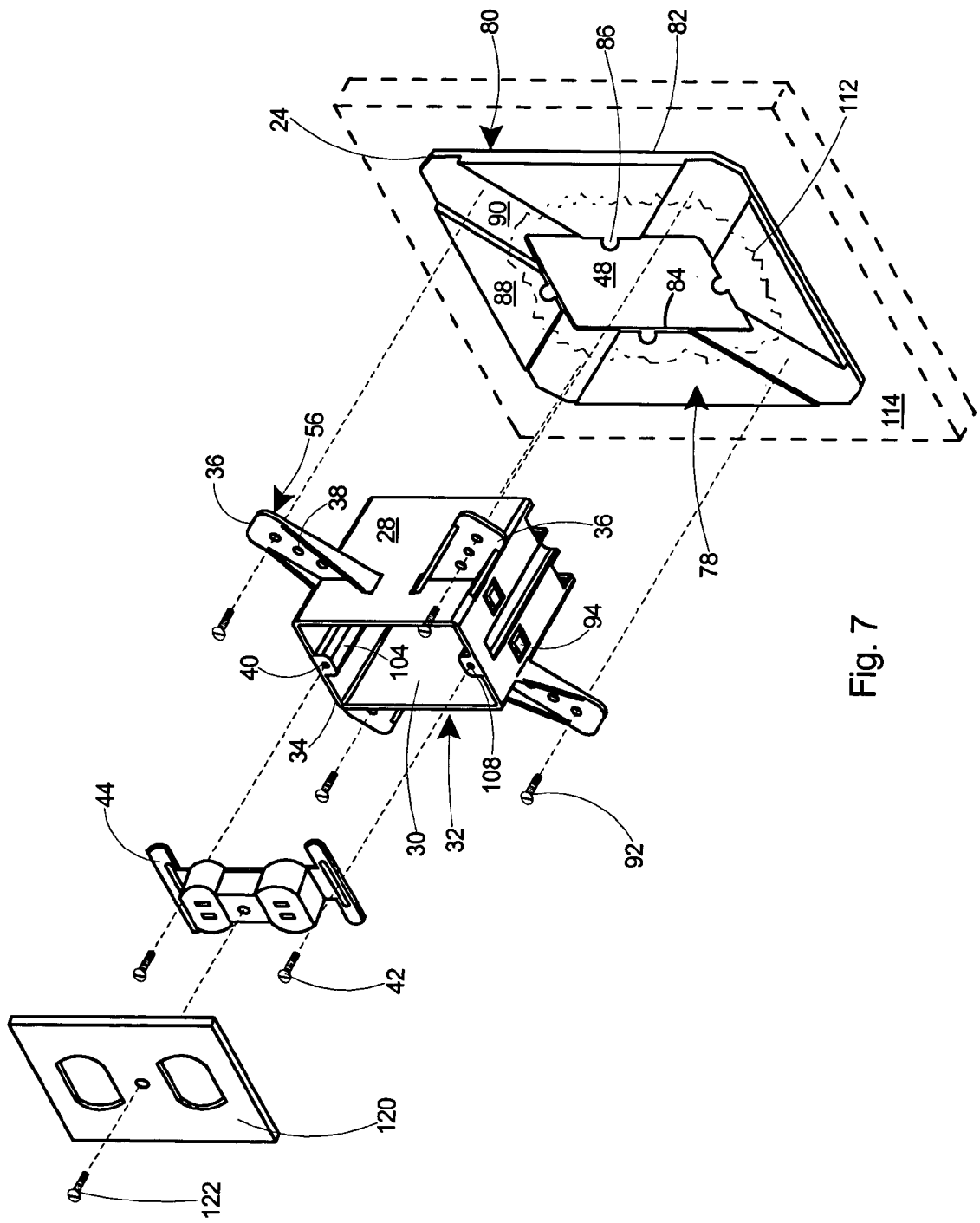
FIG. 7 is an exploded perspective view of the outlet box of FIG. 1 shown in alignment with its base plate, a hole in a block wall, and a duplex outlet and its faceplate.

Referring to FIGS. 1 and 7, an outlet box assembly 20 according to the present invention includes a housing 22 and a base plate 24. The housing 22 includes a planar back wall 26, integral peripheral sidewalls 28, and an open front 30 defining an enclosure 32 therein. The housing 22 further includes a planar front edge 34 at the open front 30 with the planar front edge 34 in a parallel plane to the planar back wall 26. One or more arms 36 are integral with and extend outwardly from the peripheral sidewalls 28. The preferred embodiment of the housing 22 shown in FIGS. 1 and 7 includes four arms arranged in an x-pattern when viewed from the open front 30 of the housing 22. One or more apertures 38 are provided in the arms 36. A securement arrangement 40 is provided at the open front of the enclosure 32 for accepting fasteners 42 of an electrical device 44.

The base plate 24 includes a central opening 48 therein, the central opening 48 adapted, in both shape and size, to accept the peripheral sidewalls 28 of the housing 22.

Figure 2:
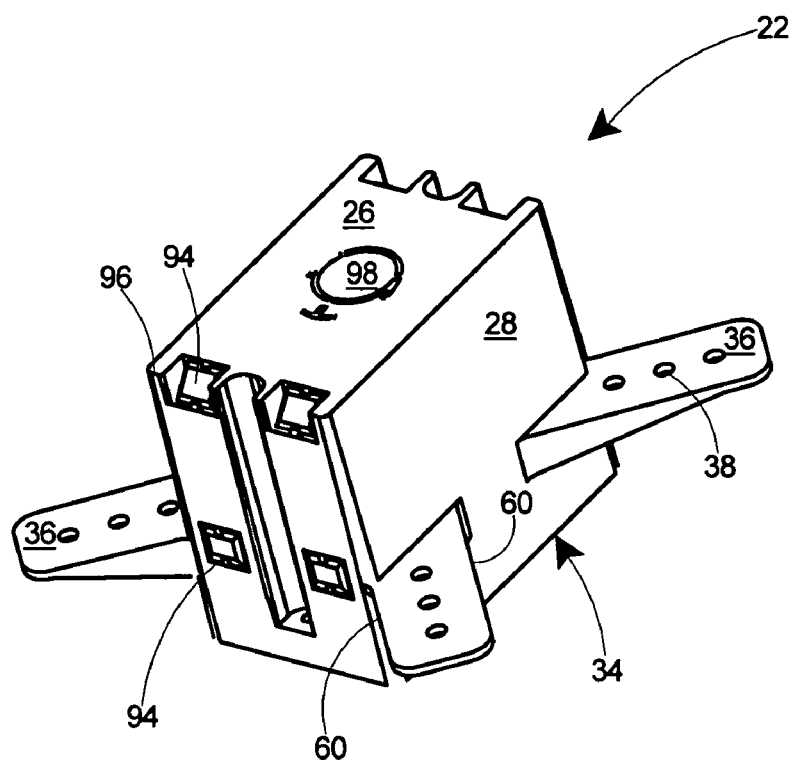
FIG. 2 is rear perspective view of the outlet box of FIG. 1.
Figure 3:
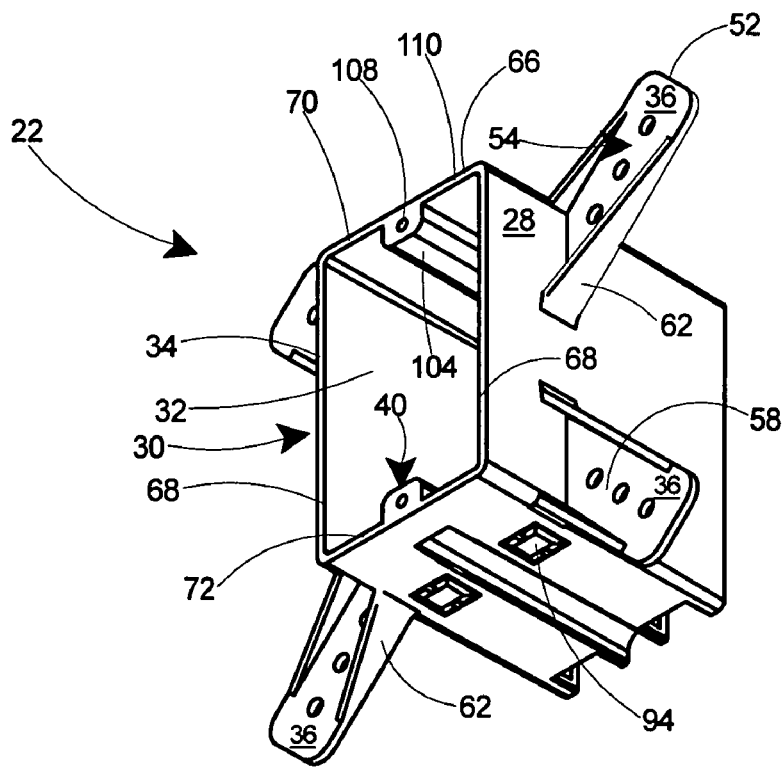
FIG. 3 is front perspective view of the outlet box of FIG. 1.

With reference to FIGS. 1–3, the arms 36 include a base end 50 adjacent the peripheral sidewalls 28 of the housing 22, a distal end 52 opposite the base end 50, a front surface 54, a back surface 56, a central portion 58 planar with the back wall 26 of the housing 22, and two edges 60. The arms 36 also include forward extending ribs 62 extending longitudinally along the edges 60 of the arms 36. The forward extending ribs 62 taper from a maximum forward extension at the base end 50 to a minimum forward extension near the distal end 52. The ribs 62 reinforce the arms 36 and improve the stiffness and rigidity of the arms 36 with respect to the housing 22.

Referring to FIG. 2, the back surface 56 of the arms 36 are planar with the planar back wall 26 of the housing 22.

Figure 5:
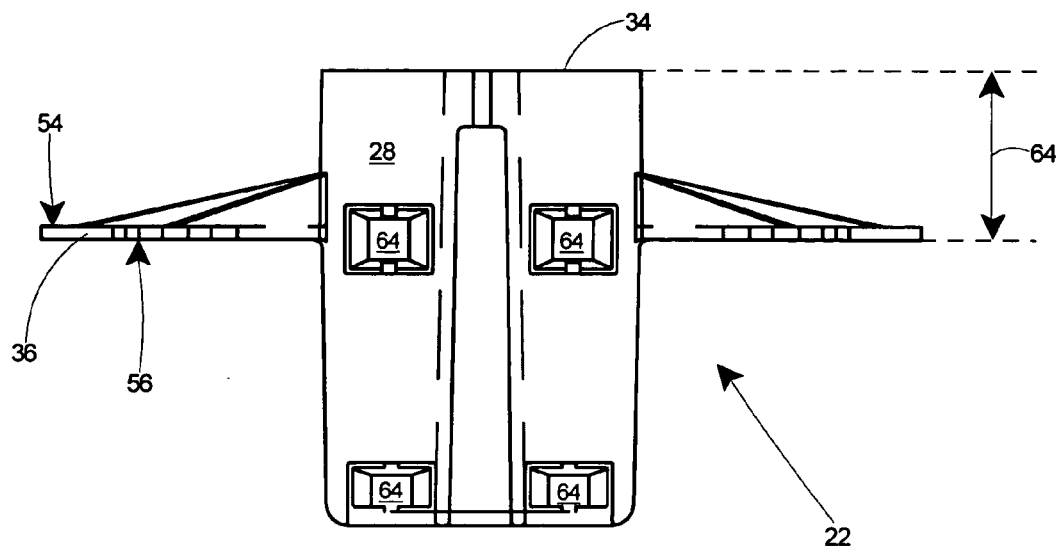
FIG. 5 is a top view of the outlet box of FIG. 1.
Figure 6:
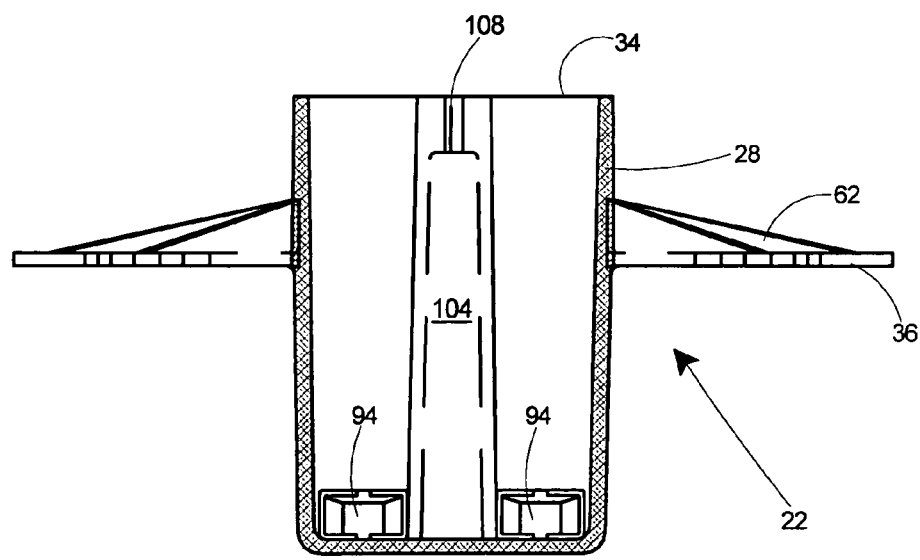
FIG. 6 is a sectional view of the outlet box taken along line 6—6 of FIG. 1.

With reference to FIGS. 5 and 6, in the preferred embodiment of the outlet box assembly 20, the back surface 56 of the arms 36 include an offset distance 64 from the planar front edge 34 of the housing 22 with the offset distance 64 being between 0.5 and 1.5 inches. This is a critical distance as block walls are frequently covered with a wall covering such as drywall or paneling. A most preferred embodiment of the housing 22 for use with drywall would have the back surface 56 of the arms 36 at an offset distance of 1.25 inches from the planar front edge 34. This would position the planar front edge 34 of the housing 22 approximately even with the outer surface of the installed drywall. First securing furring strips to the block wall and then drywall to the furring strips typically apply drywall to a block wall. Furring strips are typically 0.75 inch thick and drywall is typically 0.50 inch thick. An offset of 1.25 inch would therefore position the planar front edge 34 of the housing 22 approximately even with the face of the installed drywall.

An alternative preferred embodiment of the housing 22 for use with paneling on a frame wall would have the back surface 56 of the arms 36 at an offset distance of 0.75 inch from the planar front edge 34. This would position the planar front edge 34 of the housing 22 approximately even with the outer surface of the installed paneling. Paneling is typically applied on top of drywall that has been secured to a framed wall. Paneling is typically 0.25 inch thick and drywall is typically 0.50 inch thick. An offset of 0.75 inch would therefore position the planar front edge 34 of the housing 22 approximately even with the face of drywall that has been installed on a frame wall.

With reference to FIGS. 2 and 3, in the preferred embodiment of the outlet box assembly, the peripheral sidewalls 28 of the housing 22 include four rectangular sidewalls including two short sidewalls 66 and two long sidewalls 68. In the preferred embodiment, the arms 36 extend outwardly from the long sidewalls 68. The short sidewalls 66 include a top sidewall 70 and a bottom sidewall 72.

Referring to FIG. 1, the arms 36 include a first pair 74 of arms adjacent the top sidewall 70 and arranged laterally across the long sidewalls 68 of the housing and a second pair 76 of arms adjacent the bottom sidewall 72 and arranged laterally across the long sidewalls 68 of the housing 22. In the preferred embodiment of the outlet box assembly 20, the first pair 74 of arms 36 between the distal ends 52 are no less than 5.0 inches apart and the second pair 76 of arms 36 between the distal ends 52 are no less than 5.0 inches apart.

With reference to FIG. 7, the base plate 24 is substantially planar and includes a front surface 78, a back surface 80, outer edges 82, and inner edges 84 adjacent the central opening 48. The inner edges 84 include alignment tabs 86 extending forward from the front surface 78 of the base plate 24. Preferably, the alignment tabs 86 extend between 0.10 and 0.030 inch from the front surface 78 of the base plate 24. The base plate 24 further includes thick portions 88 and thin portions 90. The thick portions 88 improve the rigidity of the base plate 24 and the thin portions 90 enable fasteners 92 to penetrate easily through the base plate without the need to pre-drill holes there through. Preferably, the thin portions 90 of the base plate 24 are between 0.025 and 0.035 inch thick. Preferably, the thick portions of the base plate are between 0.035 and 0.050 inch thick.

Preferably, the housing 22 is molded in one piece from plastic. The base plate 24 is also molded in one piece from plastic. The plastic used to form the housing 22 and the base plate 24 is preferably selected from the group including polycarbonate, polyvinyl chloride, polyethylene, or polypropylene.

As shown in FIGS. 2 and 3, one or more removable wall sections 94 are provided on the peripheral sidewalls 28, and at the juncture 96 of the sidewall 28 and back wall 26 of the housing 22. The removable wall sections 94 in the peripheral sidewalls 28 are centered at the offset distance 64 thereby allowing access to the enclosure 32 from the front surface 78 of the base plate 24 or from the back surface 80 of the base plate.

With reference to FIG. 1, an additional removable wall section 98 is provided on the back wall 26 of the housing and includes a first removable section 100 and a second removable section 102. The first removable wall section 100 is of a first diameter and the second removable wall section 102 is of a second diameter with the second diameter larger than the first diameter. The first removable wall section 100 can be removed to provide a passageway for a small diameter cable, such as a Romex cable whereas the second removable wall section 102 can be removed in addition to the first removable wall section 100 to provide a larger passageway through the back wall 26 for a larger voltage supply line such as for metallic conduit.

Figure 4:
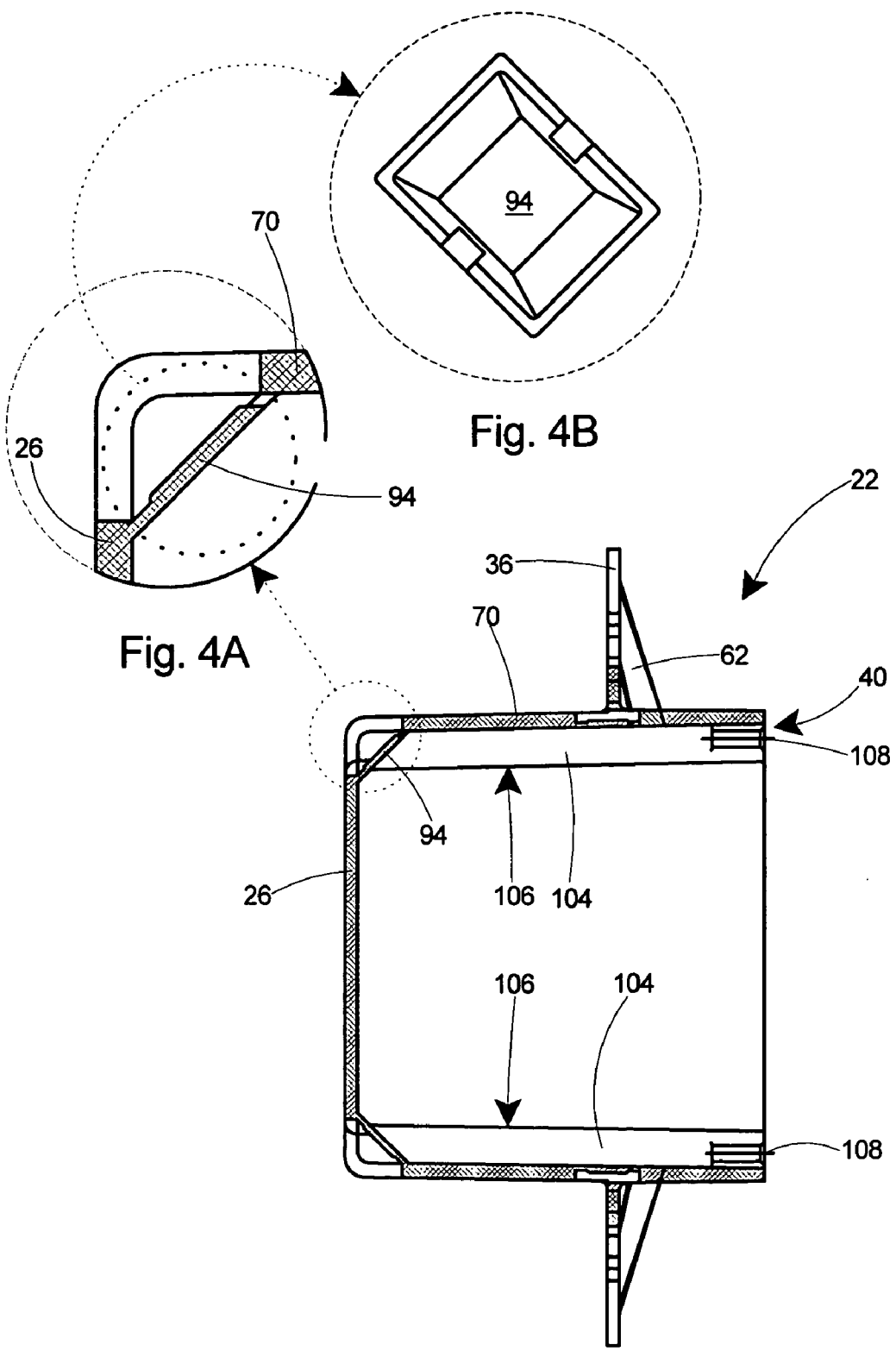
FIG. 4 is a sectional view of the outlet box taken along line 4—4 of FIG. 1.

As shown in FIG. 4, the securement arrangement 40 includes integral projections 104 from the inner surfaces 106 of the top sidewall 70 and the bottom sidewall 72 and threaded bores 108 in the integral projections 104. With reference to FIG. 3, the integral projections 104 include a front surface 110 that is coplanar with the planar front edge 34 of the housing 22. The threaded bores 108 are centered in the front surface 110 of the integral projections 104.

The outlet box assembly 20 of the present invention greatly simplifies the process of installing an outlet box on a block wall. Operation of the outlet box assembly 20 can be explained by reference to FIGS. 7–9, which show a progression of sequences in installing the base plate 24 portion of the outlet box assembly 20 to a wall 114 (FIG. 7), securing the housing 22 to the base plate 24 (FIG. 8), and the final installation showing the outlet box assembly 20 secured to a wall 114 and a duplex receptacle 44 and faceplate 120 secured to the box assembly 20. As shown in FIG. 7, a hole 112, the outlines of which are depicted in dashed lines, is created in the cement block wall 114. Typically, a hammer and chisel are used for this purpose and the hole is made generally larger than the box that will be inserted in it. The hole 112 in the block wall 114 is therefore at least large enough to accommodate the peripheral sidewalls 28 of the housing 22 portion of the outlet box assembly 20. The base plate 24 is placed over the newly created hole 112 and flush against the block wall 114. The housing 22 is then aligned with the base plate 24 and wall 114 in such a manner that the back wall 26 of the housing 22 is facing and aligned with the hole 112. The housing 22 is then inserted through the hole 112 until the back surface 56 of the arms 36 contact the front surface 78 of the base plate 24. Placement of the back wall 26 of the housing 22 through the central opening 48 in the base plate 24 until the front surface 78 of the base plate 24 contacts the back surface 56 of the arms 36 and thereby positions the arms 36 within the thin portions 90 of the base plate 24. Fasteners 92 are then inserted through one or more of the apertures 38 in the arms 36 to secure the outlet box assembly 20 to the wall 114. It is not necessary for the installer to drill holes in the base plate 24 to accommodate the fasteners 92, as the arms 36 and apertures 38 are in alignment with the thin portions 90 of the base plate 24, and a pointed fastener can easily pass through the thin portion 90 of the base plate. An electrical device, such as the duplex receptacle 44 shown in FIG. 7, is then secured to the outlet box assembly 20 by device fasteners 42 tightened into the threaded bores 108 in the front surface 110 of the integral projections 104. Securing a faceplate 120 to the electrical device 44 with a faceplate fastener 122, as shown in FIG. 9, completes the installation.

The alignment tabs 86 extend from the front surface 78 of the base plate 24 and thereby provide surfaces to guide the peripheral sidewalls 28 of the housing 22 as it is inserted through the central opening 48 in the base plate 24. Preferably, the clearance between the peripheral side walls 28 of the housing 22 and the inner edges 84 or alignment tabs 86 of the base plate 24 is 0.12 inch or less. This tight clearance between the inner edges 84 and the peripheral sidewalls 28 leaves a very small gap between the housing 22 and surrounding base plate 24 when the installation is finished, therefore eliminating the need to use pressurized foam to fill in a large gap, such as in the prior art method of installing an electrical box on a block wall.

Figure 8:
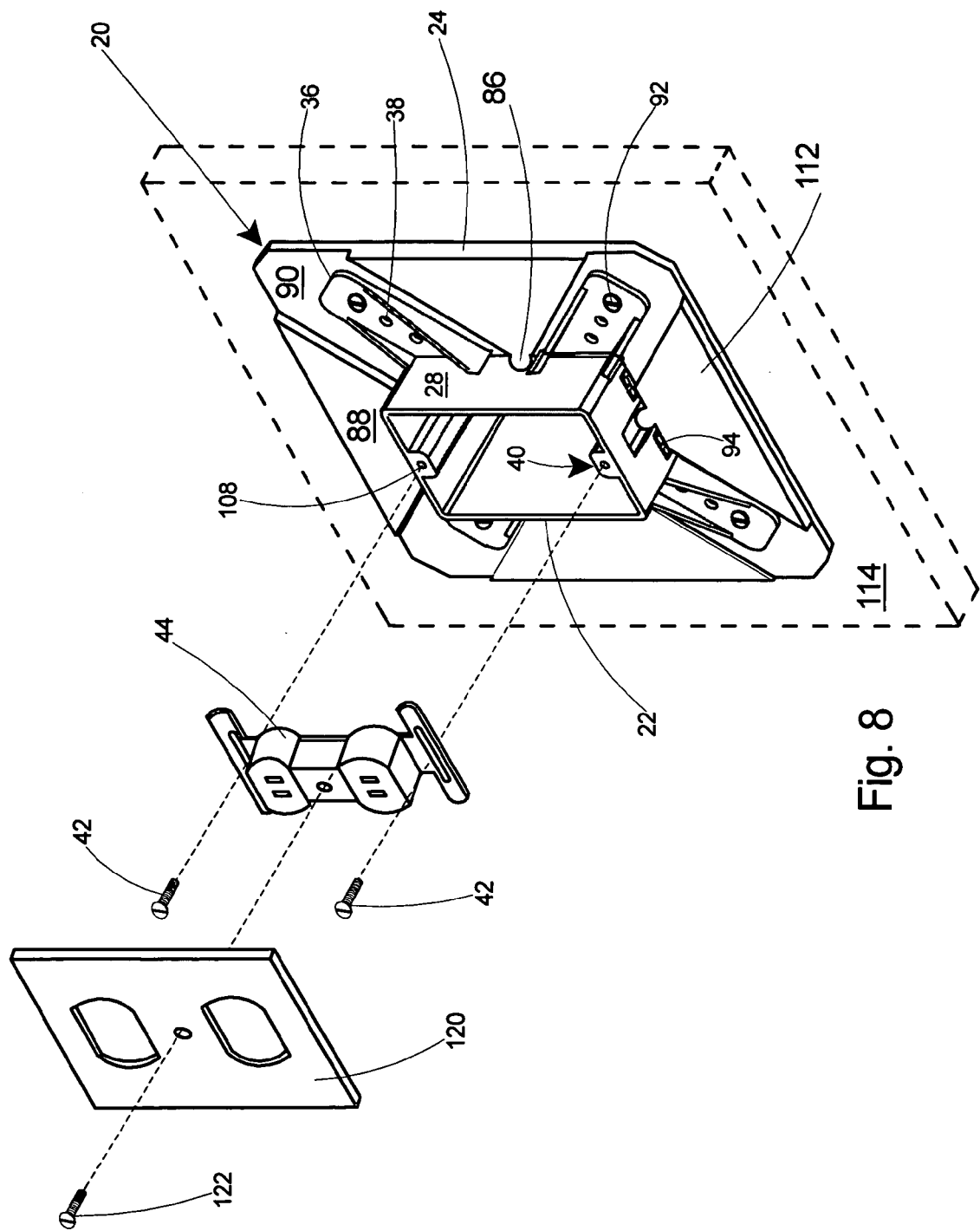
FIG. 8 is an exploded perspective view of the outlet box of FIG. 1 secured to a wall and a duplex outlet and its faceplate in alignment therewith.

The outlet box assembly 20 is shown secured to the wall 114 with fasteners 92 in FIG. 8. A duplex receptacle 44 and faceplate 120 are shown exploded away from and in alignment with the outlet box assembly 20 to which they will be secured.

Figure 9:
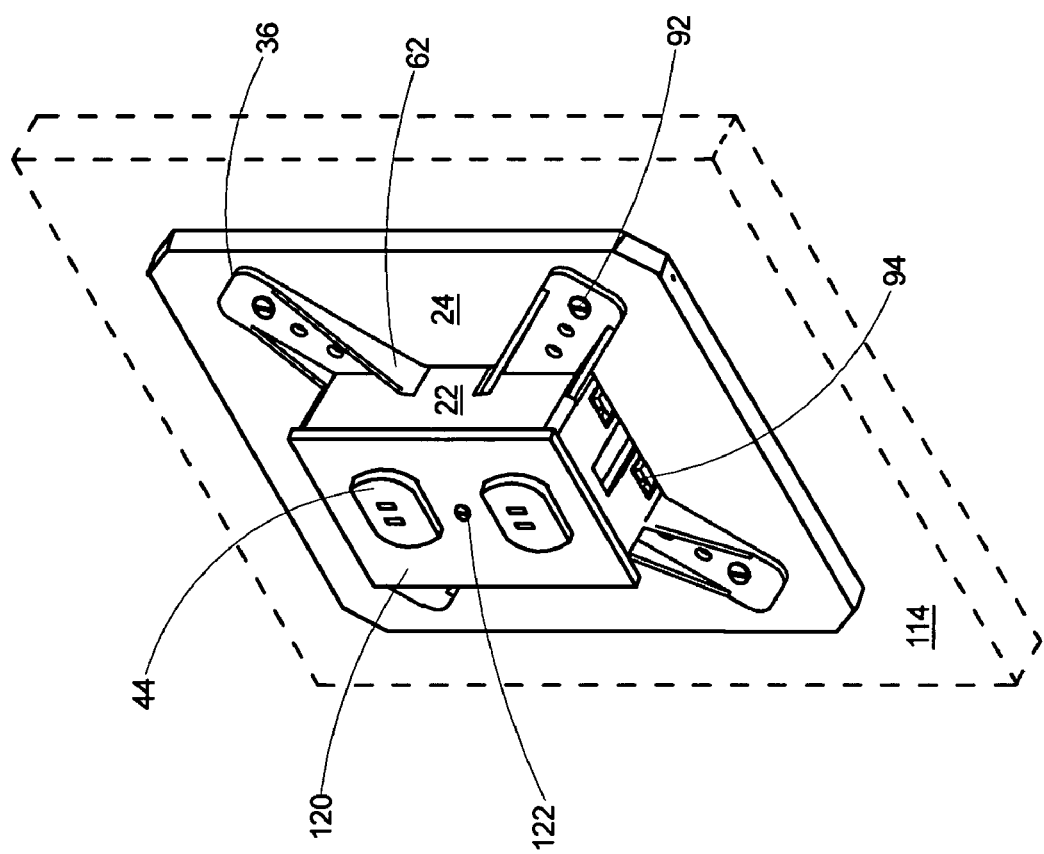
FIG. 9 is a perspective view of the X-shaped outlet box of FIG. 1 installed on a block wall.
Figure 10:
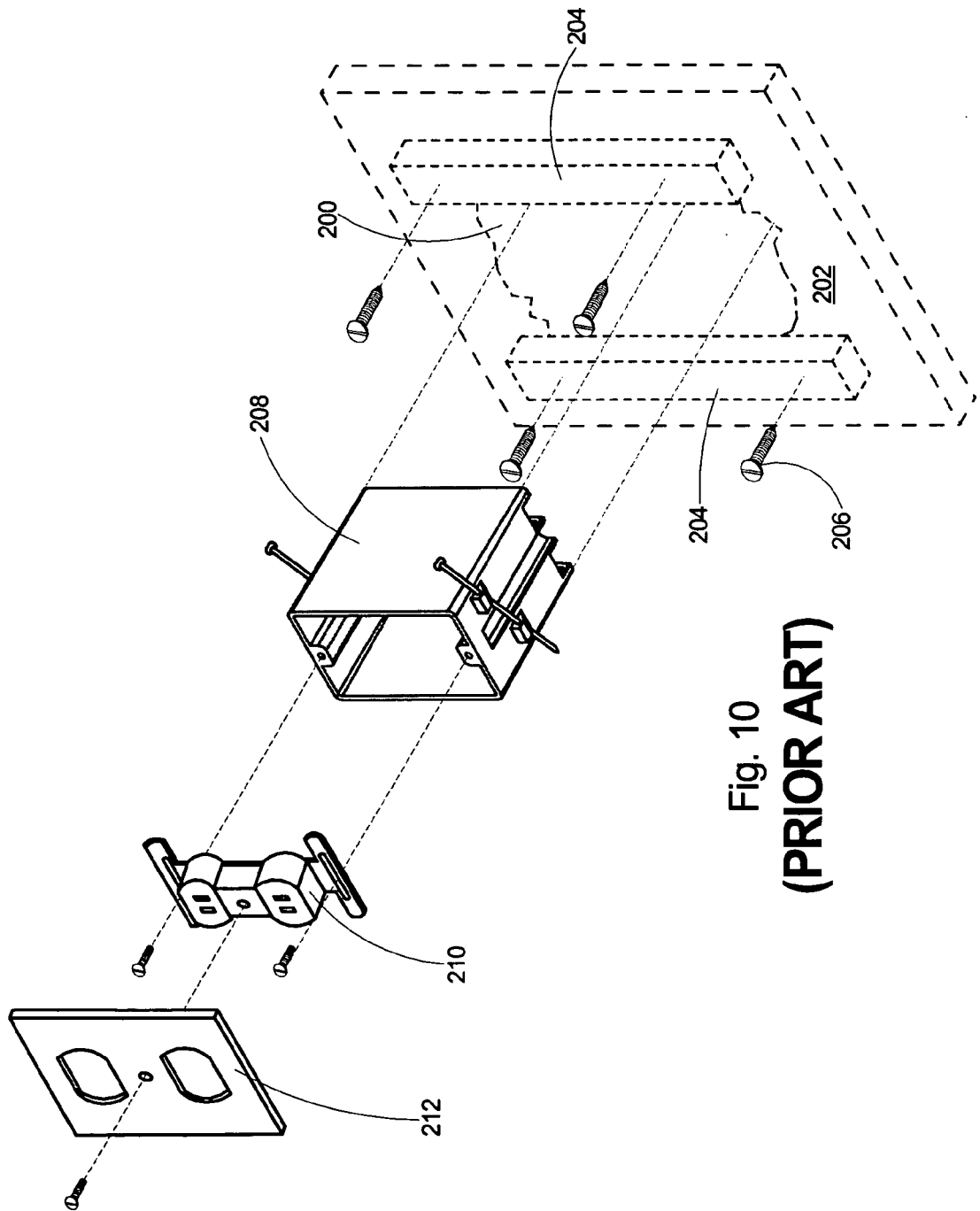
FIG. 10 is an exploded perspective view of a prior art electrical box with components in alignment therewith for installation on a block wall.
Figure 11:
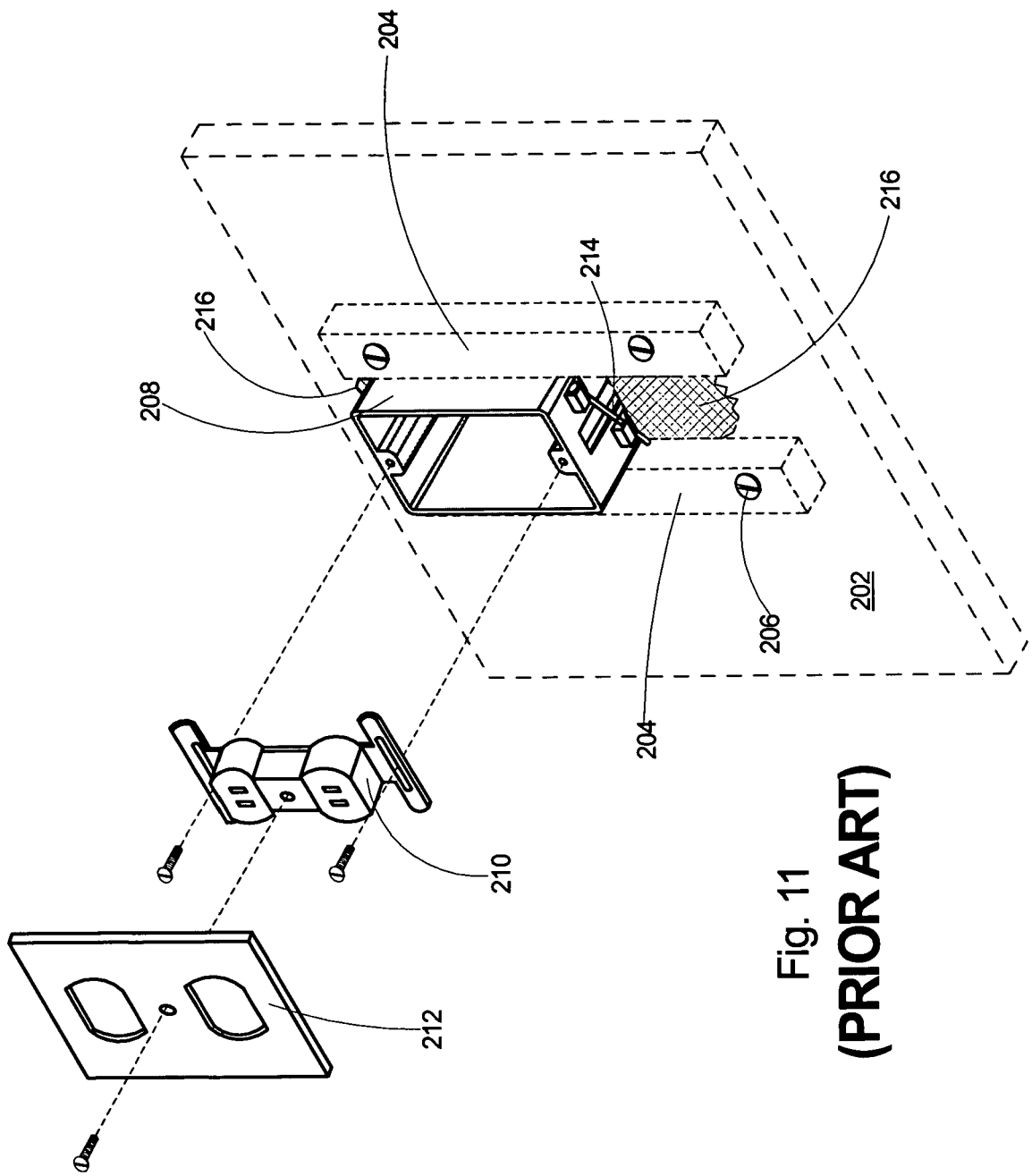
FIG. 11 is an exploded perspective view of a prior art electrical box secured to a furring strip and with electrical components in alignment therewith for installation on a block wall.
Figure 12:
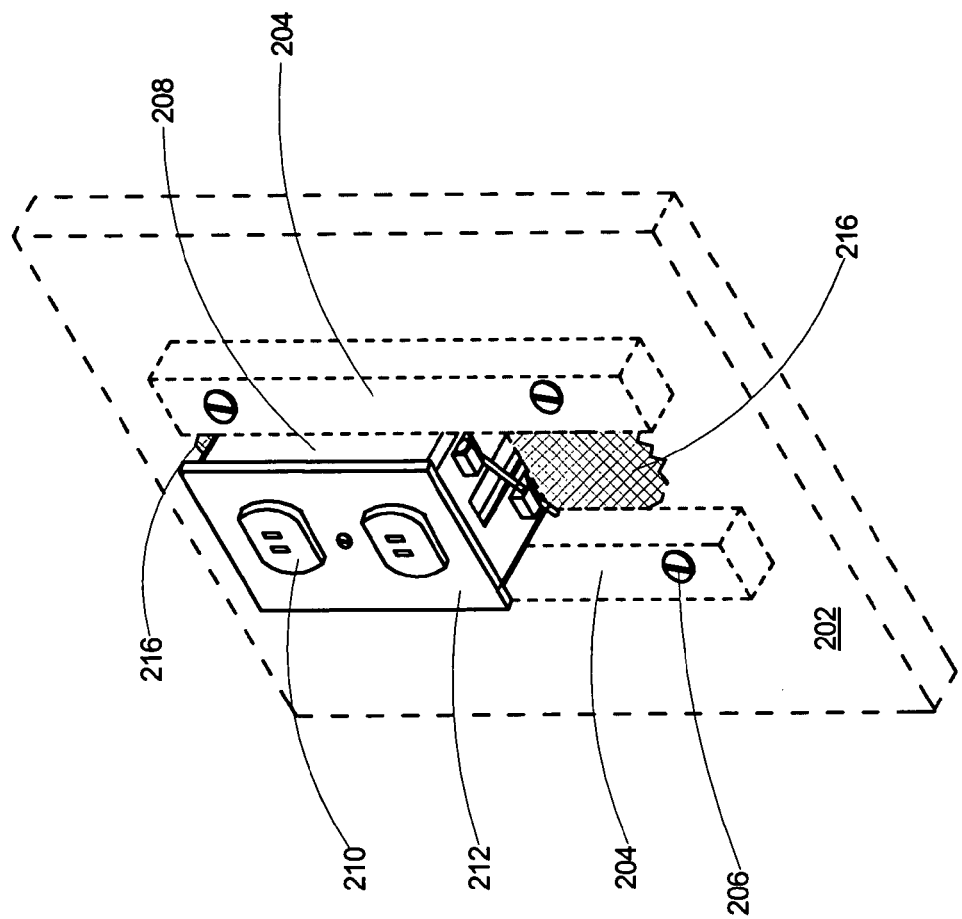
FIG. 12 is a perspective view of a prior art electrical box installed on a block wall.

A completed installation of the outlet box assembly 20 of the present invention is depicted in FIG. 9. The outlet box assembly 20 provides an attractive mounting platform to enclose and protect an electrical device such as a duplex receptacle, a switch, a timer, or any other appropriate electrical device for an electrical box. As compared to the prior art electrical box installed on a block wall in FIG. 12, the completed installation of the outlet box assembly 20 in FIG. 9 produces a much neater, simpler, easier to install electrical box. With the outlet box assembly 20, no unsightly furring strips or foam extends from the wall 114 and detracts from the neatness and cleanliness of the installation.

Having thus described the invention with reference to a one or more embodiments, it is to be understood that the invention is not so limited by the description herein but is defined as follows by the appended claims.

What is claimed is:

1. An electrical box assembly comprising:
   a housing including a back wall, integral peripheral sidewalls, and an open front defining an enclosure therein;
   a planar front edge at said open front, said planar front edge in a parallel plane to said back wall;
   one or more arms integral with and extending outwardly from said peripheral sidewalls;
   said arms rigidly fixed with respect to said side walls and with respect to said planar front edge of said housing;
   one or more apertures in said arms;
   a base plate including a central opening therein, said central opening adapted to accept said peripheral sidewalls of said housing; and
   a securement arrangement at said open front of said enclosure for accepting fasteners of an electrical device.

2. The electrical box assembly of claim 1 that includes four of said arms with said arms extending outwardly in an X-pattern when viewed from said open front of said housing.

3. The electrical box assembly of claim 2 wherein said arms include a base end adjacent said peripheral sidewalls of said housing, a distal end opposite said base end, a front surface, a back surface, a central portion planar with said back wall of said housing, and two edges.

4. The electrical box assembly of claim 3 that includes forward extending ribs extending longitudinally along said edges of said arms.

5. The electrical box assembly of claim 4 wherein said forward extending ribs taper from a maximum forward extension at said base end to a minimum forward extension near said distal end.

6. The electrical box assembly of claim 5 wherein said back surface of said arms are planar with said back wall of said housing.

7. The electrical box assembly of claim 6 wherein said back surface of said arms include an offset distance from said planar front edge of said housing with said offset distance being between 0.5 and 1.5 inches.

8. The electrical box assembly of claim 7 wherein said peripheral sidewalls include four rectangular sidewalls including two short sidewalls and two long sidewalls.

9. The electrical box assembly of claim 8 wherein said arms extend outwardly from said long sidewalls.

10. The electrical box assembly of claim 9 wherein said short sidewalls include a top sidewall and a bottom sidewall.

11. The electrical box assembly of claim 10 wherein said arms include a first pair of arms adjacent said top sidewall and arranged laterally across said long sidewalls of said housing and a second pair of arms adjacent said bottom sidewall and arranged laterally across said long sidewalls of said housing.

12. The electrical box assembly of claim 11 wherein said first pair of arms between said distal ends are no less than 5.0 inches apart and said second pair of arms between said distal ends are no less than 5.0 inches apart.

13. The electrical box assembly of claim 12 wherein said base plate is substantially planar and includes a front surface, a back surface, outer edges, and inner edges adjacent said central opening.

14. The electrical box assembly of claim 13 wherein said inner edges include alignment tabs extending forward from said front surface of said base plate.

15. The electrical box assembly of claim 14 wherein said base plate includes thick portions and thin portions.

16. The electrical box assembly of claim 15 wherein placement of said back wall of said housing through said central opening in said base plate until said front surface of said base plate contacts said back surface of said arms and thereby positions said arms within said thin portions of said base plate.

17. The electrical box assembly of claim 16 wherein said thin portions of said base plate are between 0.025 and 0.035 inch thick.

18. The electrical box assembly of claim 7 wherein said back wall and said peripheral sidewalls of said housing include one or more removable wall sections.

19. The electrical box assembly of claim 18 wherein said removable wall sections in said peripheral sidewalls are centered at said offset distance thereby allowing access to said enclosure from said front surface of said base plate or from said back surface of said base plate.

20. The electrical box assembly of claim 18 wherein said removable wall sections are located on said housing at the juncture of said back wall with said peripheral sidewalls.

21. The electrical box assembly of claim 10 wherein said securement arrangement includes
   inner surfaces on said top sidewall and said bottom sidewall;
   integral projections from said inner surfaces of said top sidewall and said bottom sidewall; and
   threaded bores in said integral projections.

22. The electrical box assembly of claim 21 wherein
  said integral projections include a front surface that is coplanar with said planar front edge of said housing; and
  said threaded bores are centered in said front surface of said integral projections.

23. The electrical box assembly of claim 13 wherein the clearance between the peripheral side walls of the housing and the inner edges of the base plate is 0.12 inch or less.

24. The electrical box assembly of claim 14 wherein said alignment tabs extend between 0.10 and 0.030 inch from said front surface of said base plate.

25. The electrical box assembly of claim 16 wherein said thick portions of said base plate are between 0.035 and 0.050 inch thick.

26. The electrical box assembly of claim 1 wherein said housing is molded in one piece from plastic.

27. The electrical box assembly of claim 26 wherein said plastic is selected from the group including polycarbonate, polyvinyl chloride, polyethylene, or polypropylene.

28. The electrical box assembly of claim 1 wherein said base plate is molded in one piece from plastic.

29. The electrical box assembly of claim 28 wherein said plastic is selected from the group including polycarbonate, polyvinyl chloride, polyethylene, or polypropylene.

30. The electrical box assembly of claim 1 wherein said back wall of said housing includes a removable wall section including a first removable section and a second removable section.

31. The electrical box assembly of claim 30 wherein
  said first removable wall section is of a first diameter;
  said second removable wall section is of a second diameter; and
  said second diameter is larger than said first diameter.

32. A method of installing an electrical box assembly on a cement block wall including
  providing a housing including a back wall, integral peripheral sidewalls, and an open front defining an enclosure therein, a planar front edge at said open front, one or more arms integral with and extending outwardly from said peripheral sidewalls, said arms rigidly fixed with respect to said side walls and with respect to said planar front edge of said housing a back surface on said arms, one or more apertures in said arms, a base plate including a central opening therein, a front surface on said base plate, and a securement arrangement at said open front of said enclosure for accepting fasteners of an electrical device;
  making a hole in said cement block wall of a size to accommodate said peripheral sidewalls of said housing;
  placing said base plate over said hole and flush against said block wall;
  orienting said housing in alignment with said base plate and wall in such a manner that said back wall of said housing is facing and aligned with said hole;
  inserting said housing through said hole until said back surface of said arms contact said front surface of said base plate; and
  inserting fasteners through one or more of said apertures in said arms to secure said housing to said cement block wall.

33. An electrical box assembly comprising:
  a housing including a back wall, integral peripheral sidewalls, and an open front defining an enclosure therein;
  a planar front edge at said open front, said planar front edge in a parallel plane to said back wall;
  one or more arms integral with and extending outwardly from said peripheral sidewalls;
  said arms rigidly fixed with respect to said side walls and with respect to said planar front edge of said housing,
  one or more apertures in said arms; and
  a securement arrangement at said open front of said enclosure for accepting fasteners of an electrical device.

34. An electrical box assembly comprising:
  a housing including a back wall, integral peripheral sidewalls, and an open front defining an enclosure therein;
  a planar front edge at said open front, said planar front edge in a parallel plane to said back wall;
  one or more arms integral with and extending outwardly from said peripheral sidewalls;
  one or more apertures in said arms;
  a base plate including a central opening therein, said central opening adapted to accept said peripheral sidewalls of said housing;
  a securement arrangement at said open front of said enclosure for accepting fasteners of an electrical device;
  said peripheral sidewalls of said housing including four rectangular sidewalls including two short sidewalls and two long sidewalls; and
  said arms including a first pair of arms adjacent said top sidewall and arranged laterally across said long sidewalls of said housing and a second pair of arms adjacent said bottom sidewall and arranged laterally across said long sidewall of said housing.

* * * * *